United States Patent [19]

Blum et al.

[11] Patent Number: 5,316,702

[45] Date of Patent: May 31, 1994

[54] METHOD OF PRODUCING DURABLE BONDS BETWEEN AN OPTICAL PREFORM AND AN OPTICAL RESIN LAYER CAST ON THE PREFORM SURFACE

[75] Inventors: Ronald D. Blum, Roanoke, Va.; Amitava Gupta, San Marino; Steve Bennington, Poway, both of Calif.

[73] Assignee: InnoTech, Inc., Roanoke, Va.

[21] Appl. No.: 915,209

[22] Filed: Jul. 20, 1992

[51] Int. Cl.⁵ .............................................. B29D 11/00
[52] U.S. Cl. ...................................... 264/1.7; 264/2.3; 264/2.7
[58] Field of Search ....................... 264/1.7, 1.8, 2.3, 2.7

[56] References Cited

U.S. PATENT DOCUMENTS

| | | | |
|---|---|---|---|
| 2,339,433 | 1/1944 | Staehle | 264/1.7 |
| 3,946,982 | 3/1976 | Calkins et al. | 249/102 |
| 4,190,621 | 2/1980 | Greshes | 264/1.8 |
| 4,474,355 | 10/1984 | Greshes | 249/53 |
| 4,623,496 | 11/1986 | Verhoeven et al. | 264/1.7 |
| 4,921,205 | 5/1990 | Drew, Jr. et al. | 264/2.3 |
| 5,104,212 | 4/1992 | Taboury | 264/1.7 |

FOREIGN PATENT DOCUMENTS

| | | | |
|---|---|---|---|
| 596659 | 4/1960 | Canada | 264/1.7 |
| 362137 | 4/1990 | European Pat. Off. | 264/1.7 |

OTHER PUBLICATIONS

Abstract of AU-A-80556/87, Jun. 2, 1988, Sola International Holdings Ltd., Inventor Philip Horley Squires, Filed Oct. 30, 1987.

*Primary Examiner*—James Lowe
*Attorney, Agent, or Firm*—Kenyon & Kenyon

[57] ABSTRACT

A method of casting an ophthalmic optic is described. A mold, an optical preform and a polymerizable resin are provided. The resin is disposed between the mold and the optical preform. The preform and the resin interact to produce a contact angle between the resin and preform of from about 20 degrees to about 45 degrees; or the mold and the resin interact to produce a contact angle between the mold and the resin of from about 45 to about 75 degrees; or both. The polymerizable resin is then cured.

Another method of casting an ophthalmic optic is also described. A mold, an optical preform and a polymerizable resin are provided. The optical preform is supplied with a surface having a regular pattern of grooves that comprise a grid formed by intersecting curves or lines imprinted on the surface of the optical preform. The polymerizable resin is provided between the optical preform and the mold such that the polymerizable resin contacts the regular pattern of grooves on the optical preform. The polymerizable resin is then cured.

13 Claims, 3 Drawing Sheets

SCALE = 1CM. = 0.5MM.

0    0.5 MM

METHOD OF PRODUCING DURABLE BONDS BETWEEN AN OPTICAL PREFORM AND AN OPTICAL RESIN LAYER CAST ON THE PREFORM SURFACE

BACKGROUND OF THE INVENTION

Ophthalmic optics may be cast by curing a polymerizable resin formulation between either a pair of molds spaced apart by a gasket, or between an optical preform and a front mold provided to form the front curvature and the add portion of the optic. Several methods for casting spherical or aspheric multifocal or progressive optics utilizing optical preforms have been disclosed. For example, U.S. Pat. No. 4,623,496, to Verhoeven discloses a method for casting multifocal ophthalmic optics from a preform and a mold without utilizing a gasket. U.S. Pat. Nos. 4,474,355 and 4,190,621 to Greshes disclose a method for casting ophthalmic optics using an optical preform and a front mold. In Greshes an edge fixture provides support to the preform and the mold and maintains the correct spacing therebetween.

Co-pending application Ser. No. 07/594,136, now U.S. Pat. No. 5,178,800, filed by the present inventor describes a method for casting single vision or multifocal ophthalmic optics that may be spherical or aspheric in geometry, and which may incorporate bifocal, trifocal or progressive addition zones. This method utilizes an optical preform that may be spherical or aspheric, and incorporates the distance prescription, including any cylinder that may be needed. The method also utilizes a front mold that has a curvature with a fixed relationship to the convex curvature of the preform which incorporates the add portion of the prescription, as well as a resin formulation having a specified viscosity which is placed in the space between the mold and the preform. Other known methods for forming an ophthalmic optic from an optical preform include those disclosed by Staehle, U.S. Pat. No. 2,339,433, Caulkins, U.S. Pat. No. 3,946,982, and Squires, Patent No. AU-A-80556/87.

For all of these known methods for forming ophthalmic quality optics from an optical preform to be successful, a secure and durable bond must be created between the preform and the cured resin layer formed between the preform and the mold. A criterion of good bonding in ophthalmic optics which has been adopted by the American National Standards Committee (ANSI) requires that the surface layer pass the "cross hatch test". In the cross hatch test, a series of deep parallel scratches are cut into the surface of the optic, followed by a second series of parallel scratches orthogonal to the first series, to form a grid pattern. Adhesive tape is securely bonded to the surface of the grid pattern and subsequently removed from the surface by pulling on the tape in a direction perpendicular to the optic surface. The tape and the optic surface are then examined for any evidence of delamination of the surface cast material. For the optic to pass the razor blade test, no delamination should be visible to the naked eye.

Bonding of the resin to the preform may be enhanced by optimizing the formulation. To accomplish this optimization, the surface energy of the preform and the resin layer should be as similar as possible to ensure excellent wetting of the preform by the resin. The resin formulation should include monomers that can readily diffuse into and permeate the surface of the preform. In practice this is achieved by ensuring that the preform and the resin formulation have at least one ingredient (monomer) in common, preferably the predominant one found in the preform. For example, if the optical preform is formed from a resin formulation based on bis diallyl carbonate (available commercially from PPG, tradename CR-39), the surface layer should be cast from a resin formulation containing CR-39 at a minimum level.

Another method for enhancing the bonding between the preform and the surface layer involves the surface treatment or surface modification of the preform. Several methods of surface modification have been developed for this purpose, and will be discussed in detail below.

Known surface treatment methods involve a chemical treatment of the preform surface, a physical treatment, or a combination of the two. Preferably, the chemical method involves chemical attachment of polymerizable silanes to the surface of the preform. Known physical treatments involve the development of a roughened surface on the preform surface which increases the area of contact between the resin and the preform surface, thus enhancing the microscopic flow of resin across the preform surface during the curing process to ensure complete coverage and uniformity of cure over the whole surface.

SUMMARY OF THE INVENTION

The present invention provides a method for casting an ophthalmic optic using a mold, an optical preform and a polymerizable resin therebetween. The method includes the step of providing a contact angle between the resin and the preform that is less than 45 degrees and more than 20 degrees. Contact angles in this range result in the resin spreading on the preform in an optimum manner According to another aspect of the invention, it is advantageous to provide a contact angle between the mold and the resin that is between 45 and 75 degrees. This range of angles has also been found to enhance the spreading of the resin.

Furthermore, to increase the contact area between the resin and the preform, as well as to enhance the flow characteristics of the resin at the preform surface, a regular pattern of grooves is imparted to the surface of the optical preform before the resin contacts the optical preform. By increasing the flow of resin on the surface of the preform, an interpenetrating network between the preform and the cured resin is created which results in a durable, permanent bond.

The regular pattern of grooves may be imparted to the preform in any known manner. However, it is particularly advantageous to cast the pattern directly into the preform. By casting the pattern rather than scratching or scoring the preform surface, stresses and strains are avoided that could potentially crack the preform.

According to an embodiment of the invention, a method of casting a ophthalmic optic is provided. This method comprises supplying a mold and an optical preform. The optical preform has a surface with a regular pattern of grooves. The regular pattern of grooves comprises a grid formed by intersecting curves or lines imprinted on the surface of the optical preform. A polymerizable resin is provided between the optical preform and the mold such that the polymerizable resin contacts the regular pattern of grooves on the optical preform.

The polymerizable resin is then cured. The preform is preferably cast from a pair of molds spaced apart by a gasket and a polymerizable resin after imprinting a surface of one of the molds with a regular pattern of grooves.

Various other advantages of the methods of the present invention will be evident from the detailed description of certain embodiments below.

DETAILED DESCRIPTION OF THE INVENTION

Figure 2A:
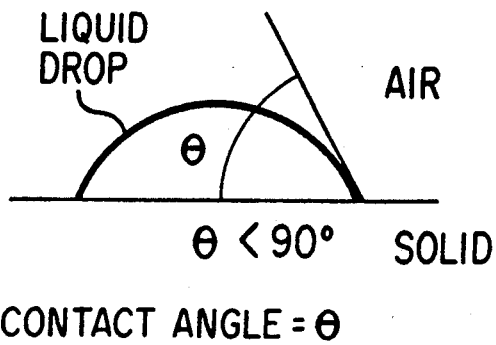
FIG. 2A and 2B show the contact angles between a liquid drop and a solid surface in air.
Figure 2B:
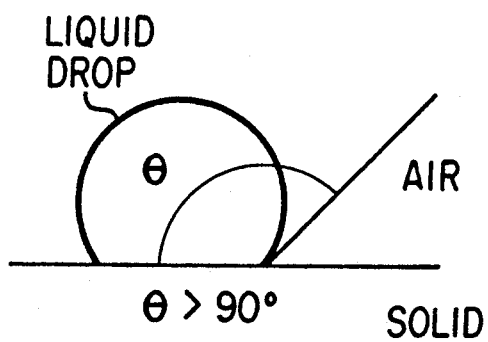

The optical preform, when formed from CR-39 or similar resins, consists of a crosslinked glassy polymer, the surface of which is flat and polished. Moreover, the surface is hydrophobic, and the surface energy is low since the effective surface area per unit area is also low. When casting a surface layer of resin over the convex surface of such a preform (for example, as described in applicant's co-pending application Ser. No. 594,136, now U.S. Pat. No. 5,178,800), the preform is gently lowered into the resin pool which had been previously deposited on the concave bowl formed by the mold. At this point, the resin is spread out to cover both surfaces and fill the intervening space between the mold and the preform. The spreading of the resin is controlled by the contact angle of the resin on the preform and the mold. The contact angle $\theta$ is measured as shown in FIG. 2A and 2B. The mechanical work of adhesion, Wadh, depends on the contact angle $\theta$ of the resin forward on any surface (i.e., Wadh=$\gamma$ Cos $\theta$) where $\theta$ is the contact angle. For spreading to occur, Wadh > Wsg + Wlg (i.e., a solid-liquid interface will displace a solid-gas/air and a liquid-gas/air interface. When a drop of resin is placed on the surface of a preform or mold, the drop of resin flattens and spreads until the contact angle reaches a value such that the work of adhesion between the liquid and solid matches the sum of the works of adhesion between the solid surface and air and the liquid and air. A contact angle greater than 75 degrees indicates a low level of interaction between the liquid and the solid surface, while a contact angle less than 20 degrees indicates a high level of liquid-solid interaction.

In spreading the resin, the weight of the preform overcomes the force required to form the resin-glass and the resin-preform interfaces, and thus the thickness of the resin in equilibrium depends on the contact angles at each of the two interfaces. The larger the two contact angles, the greater is the force required to form the interfaces. Increasing this force reduces the area covered by the resin, and increases the resin thickness at equilibrium. The viscosity of the resin controls the rate at which the resin spreads and the time needed to attain equilibrium. For the surface casting process to be successful, the optimum thickness of the resin layer at equilibrium must be determined and there must be a moderately favorable interaction between the resin and the mold surface. Furthermore, there must be a strong interaction between the resin and the surface of the preform. For optimum results, the contact angle at the resin-mold interface should be moderately high (i.e., greater than 30 degrees but less than 75 degrees, if the mold is made of glass), while the contact angle at the resin-preform interface should be low (i.e., less than 40 degrees).

If the surface energy relationships specified above are attained, the resin should readily spread upon and wet the surface of the preform. When these relationships are satisfied, the rate of diffusion of the resin into the preform will depend on the total surface area of the preform in contact with the resin, the temperature, and the level of flow of the resin allowed over the surface of the preform.

Figure 1:
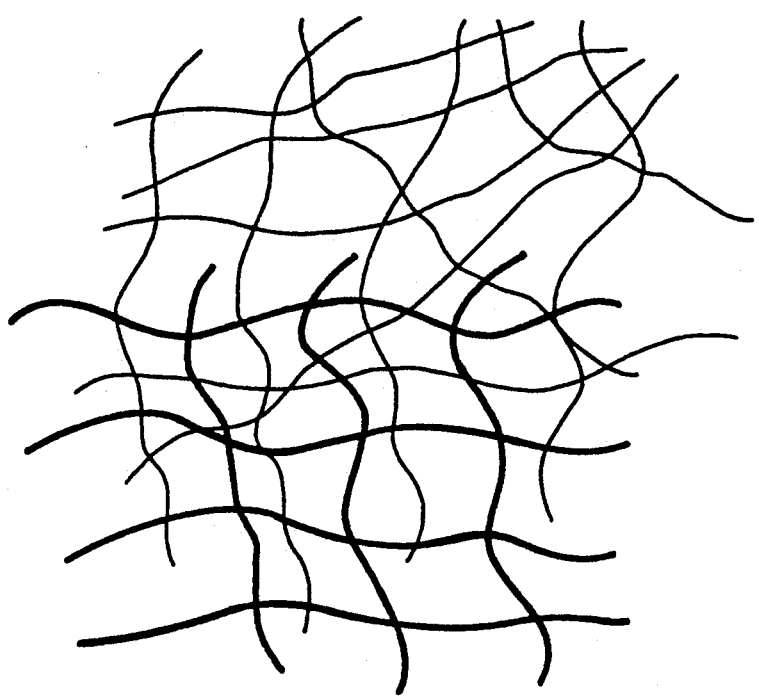
FIG. 1 shows a schematic illustration of an interpenetrating network formed between two crosslinked polymers permanently bonded to each other.

Since the surface of the preform is crosslinked and glassy at use temperature, the only way to form a durable bond between the preform and the cured resin is by forming an interpenetrating network, as shown in FIG. 1. The interpenetrating layer may be formed by chemically modifying the surface of the preform leading to the attachment of polymerizable groups which can participate in the cure process occurring in the resin layer at the surface. These pendant groups become part of the cured resin layer, forming a secure bond between the preform and the surface layer. To maximize the probability of reaction between the polymerizable groups and the corresponding reactive groups in the constituents of the resin, it is necessary to ensure that the resin properly diffuses and permeates into the surface layers of the preform, and that the resin satisfactorily flows along the surface of the preform during the cure process.

If the surface of the preform is not chemically modified, the monomeric constituents of the resin will diffuse into and permeate the surface layers of the preform, reacting with each other (but not with the preform) during the curing process. The surface layers of the preform serve as a permeable matrix in which these curing reactions take place. Eventually a crosslinked polymer network will be formed by the resin. This network will be intertwined with the matrix network of the preform to provide a permanent bond between the resin layer and the surface of the preform. The flow rate of the resin will determine the extent to which this network forms, since such a flow is required to restore local concentrations of the resin monomers as they become depleted by participating in the curing process.

Figure 3A:
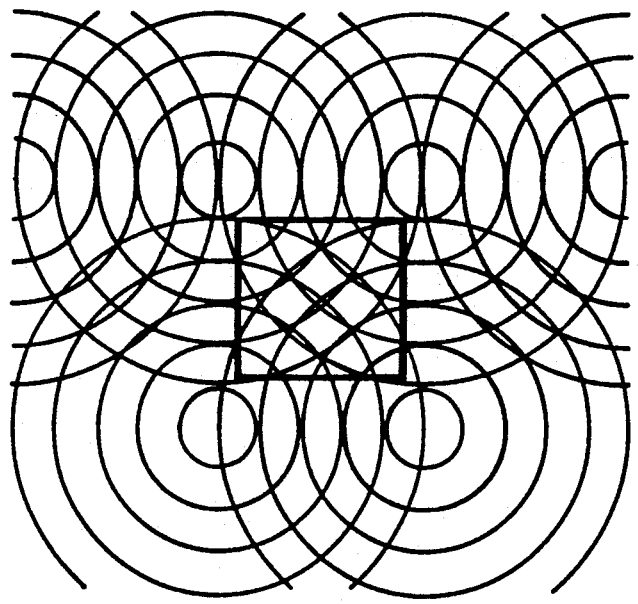
FIG. 3A and 3B schematically illustrate alternative grid patterns that may be imprinted on the optical preform or the mold according to the method of the present invention.
Figure 3B:
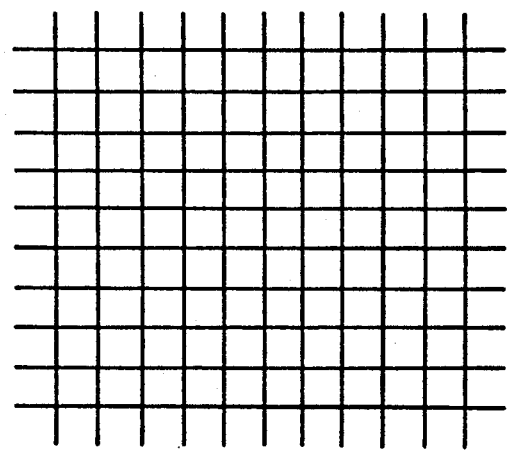
Figure 3B:

Applicants have found that grid patterns such as shown in FIGS. 3A and 3B, which are formed on the surface of the optical preform, increase the contact area between the resin and preform and enhance the flow characteristics of the resin at the preform surface. The grid pattern seen within the area enclosed by the dark lines in the center of FIG. 3A is particularly advantageous. In known methods such as disclosed by Squires in Patent No. AU-A-80556-87, random scratches or surface roughening are imparted to the preform surface, which may increase the surface area of contact. However, the scratched or roughened surface does not increase the resin flow at the surface of the preform. Consequently, the random scratches or surface roughening are not particularly effective in producing a permanent bond between the preform and the cured surface layer. Therefore, while these known methods might provide an initial increase in the bond strength of an optic, the enhancement may not be permanent. Furthermore, the known methods also yield a random and variable relationship between the degree of roughening and the bond strength enhancement, because different types of scratches may allow different rates of resin flow. In other words, while surface roughening may consistently increase the area of contact between the resin layer and the preform, it may not have any effect on the rate of resin flow at the surface. Just as bulk flow inside the resin layer during the cure process is deemed essential to ensure optical and chemical homogeneity of the added surface layer, surface flow is needed to ensure the continued availability of reactive groups at the resin-preform interface, and to ensure the formation of an interpenetrating network necessary for a permanent bond.

Another problem with the known method disclosed by Squires is that in Squires, the scratches or roughening are imparted by scoring the surface. Applicants have determined that these score marks create stresses and strains in the preform during periods of extended testing or annealing that eventually lead to cracks in the preform. These stresses and strains occur because the surface is scored after the preform is cast. Accordingly, it is advantageous to cast the regular pattern directly into the preform so that these stresses and strains are avoided.

Although it is advantageous to cast the grid patterns shown in FIGS. 3A and 3B into the preform by providing a regular pattern to the preform molds, the patterns may also be directly added to the surface of the preform in any manner desired. Various tools with rotary or linear translation may be employed to form the grid patterns.

What is claimed is:

1. A method of casting an ophthalmic optic comprising:
    providing a mold, an optical preform and a polymerizable resin disposed between said mold and said optical preform, wherein said preform and said resin interact to produce a contact angle between said resin and said preform of from about 20 degrees to about 45 degrees; and
    curing said polymerizable resin.

2. The method of casting an ophthalmic optic of claim 1, wherein said contact angle between said resin and said preform is from 20 degrees to 45 degrees.

3. The method of casting an ophthalmic optic of claim 1, wherein said mold and said resin interact to produce a contact angle of from about 45 degrees to about 75 degrees.

4. The method of casting an ophthalmic optic of claim 3, wherein said contact angle between said resin and said preform is from 20 degrees to 45 degrees and wherein said contact angle between said resin and said mold is from 45 degrees to 75 degrees.

5. A method of casting an ophthalmic optic comprising:
    providing a mold with a glass surface, an optical preform and a polymerizable resin disposed between said mold and said optical preform, wherein said mold and said resin interact to produce a contact angle between said mold and said resin of from about 45 to about 75 degrees; and
    curing said polymerizable resin.

6. The method of casting an ophthalmic optic of claim 5, wherein said contact angle between said resin and said mold is from 45 degrees to 75 degrees.

7. A method of casting an ophthalmic optic comprising:
    providing a mold and an optical preform, said preform having a surface with a regular pattern of grooves, said regular pattern of grooves comprising a grid formed by intersecting curves or lines imprinted on said surface of said optical preform, said grid being formed by a series of repeating regions each completely bounded by said intersecting curves or lines, each region having an area between 0.0001 sq mm and 0.04 sq mm,
    providing a polymerizable resin between said optical preform and said mold such that said polymerizable resin contacts said regular pattern of grooves on said optical preform; and
    curing said polymerizable resin.

8. The casting method of claim 7 wherein each of said regions is substantially rectangular in shape.

9. The casting method of claim 8 wherein each of said regions is substantially circular in shape.

10. A method of casting a ophthalmic optic comprising:
    providing a mold and an optical preform, said optical preform having a surface with a regular pattern of grooves, said regular pattern of grooves comprising a grid formed by intersecting curves or lines imprinted on said surface of said optical preform;
    providing a polymerizable resin between said optical preform and said mold such that said polymerizable resin contacts said regular pattern of grooves on said optical preform;
    and curing said polymerizable resin.

11. The method of claim 10 wherein said regular pattern further comprises a first series of substantially concentric grooves and at least a second series of substantially concentric grooves laterally displaced relative to the first series of substantially concentric grooves.

12. The method of claim 10 wherein said imparting step further comprises casting said regular pattern of grooves into the preform during formation of the preform.

13. The method of claim 12 further comprising the step of casting the preform from a pair of molds spaced apart by a gasket and a polymerizable resin after imprinting a surface of one of said molds with the regular pattern of grooves.

* * * * *